(12) United States Patent
Tanaka et al.

(10) Patent No.: US 10,693,676 B2
(45) Date of Patent: Jun. 23, 2020

(54) RELAY DEVICE

(71) Applicant: DENSO CORPORATION, Kariya, Aichi-pref. (JP)

(72) Inventors: Hiroto Tanaka, Kariya (JP); Mitsutoshi Kato, Kariya (JP); Katsuhiko Furuta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/293,978

(22) Filed: Mar. 6, 2019

(65) Prior Publication Data

US 2019/0199550 A1 Jun. 27, 2019

Related U.S. Application Data

(63) Continuation of application No. PCT/JP2017/032104, filed on Sep. 6, 2017.

(30) Foreign Application Priority Data

Sep. 9, 2016 (JP) .................................. 2016-176822

(51) Int. Cl.
*H04L 12/46* (2006.01)
*G06F 13/40* (2006.01)
(Continued)

(52) U.S. Cl.
CPC .......... *H04L 12/46* (2013.01); *G06F 13/4045* (2013.01); *H04L 12/12* (2013.01); (Continued)

(58) Field of Classification Search
CPC ... H04L 12/46; H04L 12/12; H04L 12/40006; H04L 2012/40215; H04L 12/40091; H04L 12/40189; G06F 13/4045
See application file for complete search history.

(56) References Cited

U.S. PATENT DOCUMENTS

2002/0006139 A1 1/2002 Kikkawa et al.
2010/0031106 A1* 2/2010 Isoyama ............... H04L 1/0061
714/746

(Continued)

FOREIGN PATENT DOCUMENTS

JP 2002026957 A 1/2002

*Primary Examiner* — Thai Nguyen
(74) *Attorney, Agent, or Firm* — Harness, Dickey & Pierce, P.L.C.

(57) ABSTRACT

A relay device may include a plurality of communication circuits and a state control portion. The relay device may relay the data among a plurality of buses, each of which connecting one or more nodes. The plurality of communication circuits may perform transmission and reception of the data, and transition among a plurality of states including a transmission enabled state and a transmission disabled state. The plurality of communication circuits may be connected to the plurality of buses in one to one manner. The state control portion may cause a specific communication circuit to transition from the transmission enabled state to the transmission disabled state when a relay transition time has elapsed from an occurrence of predetermined event. The specific communication circuit may represent at least one of the plurality of communication circuits to which at least one of the plurality of buses connecting the specific node is connected.

6 Claims, 5 Drawing Sheets

(51) Int. Cl.
  *H04L 12/12*   (2006.01)
  *H04L 12/40*   (2006.01)
(52) U.S. Cl.
  CPC .................. *H04L 12/40006* (2013.01); *H04L 2012/40215* (2013.01)

(56) References Cited

U.S. PATENT DOCUMENTS

2016/0065409 A1* 3/2016 Kim ........................ H04L 67/12
                                                          709/223
2016/0294855 A1* 10/2016 Maeda ..................... H04L 12/28

* cited by examiner

RELAY DEVICE

CROSS REFERENCE TO RELATED APPLICATIONS

The present application is a continuation application of International Patent Application No. PCT/JP2017/032104 filed on Sep. 6, 2017, which designated the United States and claims the benefit of priority from Japanese Patent Application No. 2016-176822 filed on Sep. 9, 2016. The entire disclosures of all of the above applications are incorporated herein by reference.

TECHNICAL FIELD

The present disclosure relates to a technique for relaying data among multiple buses.

BACKGROUND

A communication system transitions from a transmission enabled state, which enables a relay device to transmit data, to a transmission disabled state, which disables the relay device to transmit the data, when there is no data to be relayed in the relay device.

SUMMARY

A relay device may include a plurality of communication circuits and a state control portion. The state control portion may cause a specific communication circuit to transition from a transmission enabled state to a transmission disabled state when a relay transition time has elapsed from an occurrence of predetermined event.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

For example, a communication system transitions from a transmission enabled state, which enables a relay device to transmit data, to a transmission disabled state, which disables the relay device to transmit the data, when there is no data to be relayed in a relay device. With this configuration, power consumption in the relay device can be reduced. The relay device relays the data when the relay device is in the transmission disabled state. In this case, each node transmits a wakeup frame other than the data to be relayed to the relay device when the relay device is in the transmission disabled state. With this configuration, each node causes the relay device to transition from the transmission disabled state to the transmission enabled state, and transmits the data to be relayed.

The inventor has found that the configuration of the above-described communication system becomes complicated as whole system since each node needs to have a configuration to activate the relay device.

An example embodiment of the present disclosure, the communication system that has the relay device relaying the data among the multiple buses is simplified in a structure and prevents the relay device from being incapable of relaying the data.

An example embodiment of the present disclosure, a relay device includes a plurality of communication circuits and a state control portion. The relay device relays the data among a plurality of buses, each of which connecting one or more nodes.

At least one of the one or more nodes defined as a specific node. The specific node transitions among a plurality of states including a transmission enabled state and a transmission disabled state. The transmission enabled state enables the specific node to transmit the data. The transmission disabled state disables the specific node to transmit the data. The specific node transitions from the transmission enabled state to the transmission disabled state when a predetermined node transition time has elapsed from an occurrence of a predetermined event.

The plurality of communication circuits perform transmission and reception of the data, and transition among a plurality of states including a transmission enabled state and a transmission disabled state. The plurality of communication circuits are connected to the plurality of buses in one to one manner. The state control portion causes a specific communication circuit to transition from the transmission enabled state to the transmission disabled state when a relay transition time has elapsed from an occurrence of predetermined event. In the relay transition time, a predetermined additional time is added to a node transition time. The specific communication circuit represents at least one of the plurality of communication circuits to which at least one of the plurality of buses connecting the specific node is connected.

In an example embodiment of the present disclosure, the relay transition time, for which the specific communication circuit transitions from the transmission enabled state to the transmission disabled state, is set to be longer than the node transition time, for which the specific node transitions from the transmission enabled state to the transmission disabled state. With this configuration, while the specific node is in the transmission enabled state, the relay device can prevent the specific communication circuit from transitioning to the transmission disabled state. Thus, the configuration can simplify the structure of the communication system, and can prevent the relay device from being incapable of relaying the data transmitted from the specific communication circuit due to the relay device that is in the transmission disabled state.

Hereinafter, embodiments of the present disclosure will be described below with reference to the drawings.

1. First Embodiment

1-1. Configuration

Figure 1:
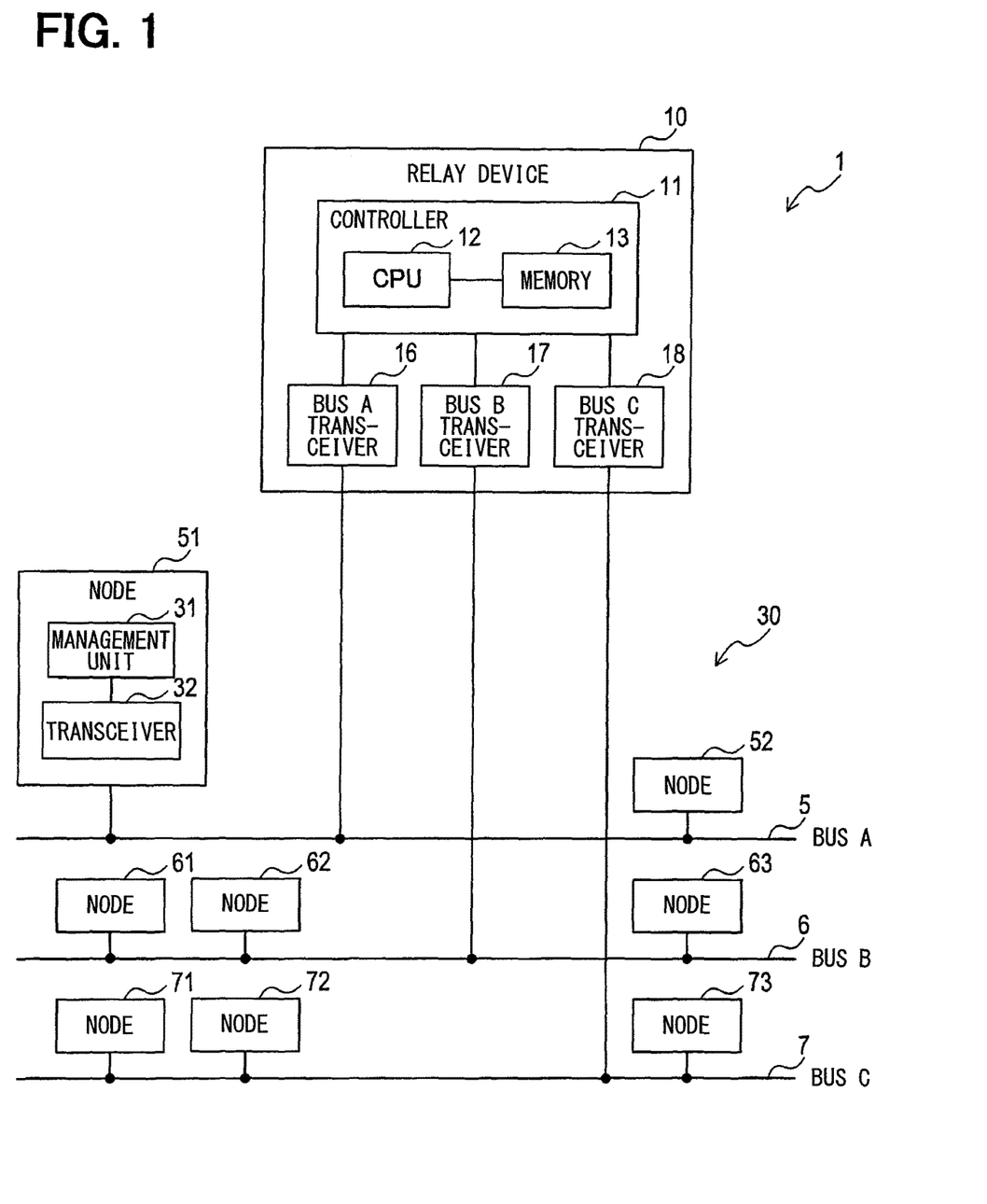
FIG. 1 is a block diagram showing a configuration of a communication system 1.

A communication system 1 shown in FIG. 1 is attached to a vehicle such as a passenger car. The communication system 1 includes a relay device 10 and multiple nodes 51, 52, 61, 62, 63, 71, 72, 73. Hereinafter, the multiple nodes 51, 52, 61, 62, 63, 71, 72, 73 are also denoted as multiple nodes 30 when all of the multiple nodes 51, 52, 61, 62, 63, 71, 72, 73 are represented. Each of the multiple nodes 30 is also denoted as a node 30.

The relay device 10 includes a controller 11, a bus A transceiver 16, a bus B transceiver 17, and a bus C transceiver 18. The bus A transceiver 16, the bus B transceiver 17, and the bus C transceiver 18 are collectively referred to as multiple bus transceivers 16, 17, 18.

The bus A transceiver 16 is connected to a bus A5, which is a communication line, and performs transmission and reception of the data between the bus A5. The nodes 51, 52 are connected to the bus A5.

The bus B transceiver 17 is connected to a bus B6, which is a communication line, and performs transmission and reception of the data between the bus B6. The nodes 61, 62, 63 are connected to the bus B6.

The bus C transceiver 18 is connected to a bus C7, which is a communication line, and performs transmission and reception of data between the bus C7. The nodes 71, 72, 73 are connected to the bus C7.

The relay device 10 communicates with the node 30 using an arbitrary communication protocol via the corresponding one of the buses 5, 6, 7. As the communication protocol, for example, a CAN (Controller Area Network: registered trademark) protocol can be employed.

The relay device 10 and the node 30 generates and transmits frames including an event frame and a communication request frame corresponding to the transmission request generated by the controller 11 and management unit 31 and the communication request frame obtained through each of the buses 5, 6, 7.

The transmission request represents a command to transmit the data that is generated by the controller 11 or the management unit 31 by executing an arbitrary application. The event frame represents a frame with high importance indicating, for example, a warning or a notification. The communication request frame represents a request for transmitting the data from another node including the relay device 10.

The controller 11 includes a well-known microcomputer having a CPU 12 and a semiconductor memory (hereinafter, referred to as a memory 13) such as a RAM, a ROM, or a flash memory. Various functions of the controller 11 are implemented by executing a program stored in a non-transitory tangible storage medium by the CPU 12. The non-transitory tangible storage medium represent storage medium exclusive of electromagnetic waves. In this example, the memory 13 corresponds to the non-transitory tangible storage medium for storing a program. When the program is executed, a method corresponding to the program is executed. The number of microcomputers constituting the controller 11 may be one or more.

The controller 11 has a state transition function, a function as a gateway processing as will be described below, and a well-known relay function relaying the data, each of which is provided as a configuration of a function achieved by the CPU 12 executing a program. The state transition function causes the state of each of the multiple bus transceivers 16, 17, 18 to transition. A method for implementing these elements constituting the controller 11 is not limited to software and some or all of the elements may be implemented using one or more hardware elements. For example, when the above functions are implemented by an electronic circuit that is hardware, the electronic circuit may be implemented by a digital circuit that includes a large number of logic circuits, an analog circuit, or a combination of the digital circuit and the analog circuit.

Figure 2:
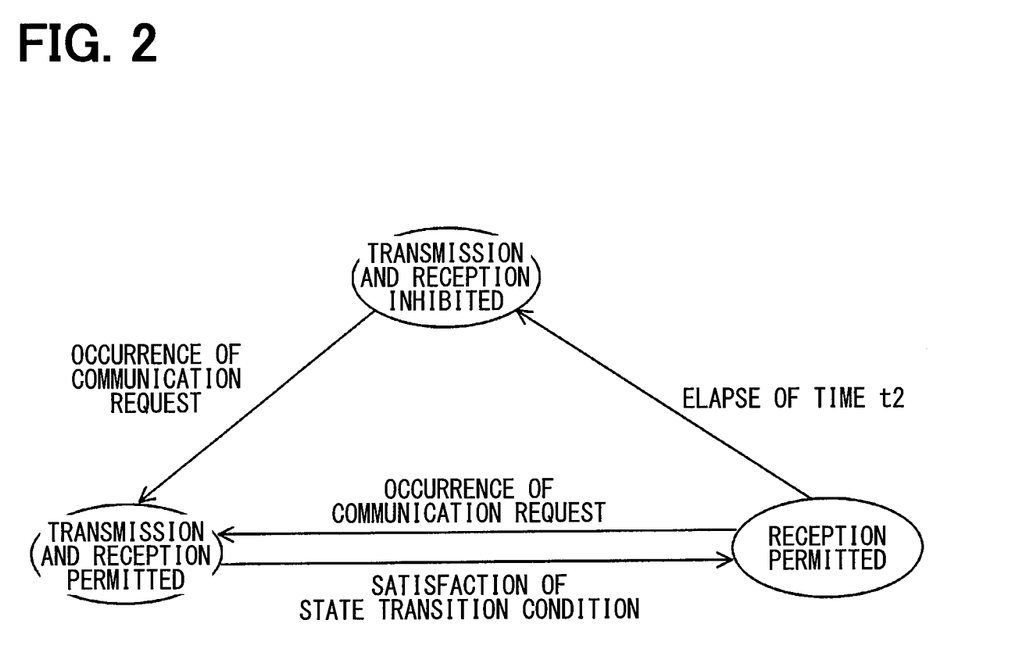
FIG. 2 is a diagram showing a state transition in a transceiver.

As shown in FIG. 2, the controller 11 causes the operation state of each of the multiple bus transceivers 16, 17, 18 to transition individually, as the state transition function, among a transmission and reception permitted state, a reception permitted state, and a transmission and reception inhibited state as the state transition function.

In the transmission and reception permitted state, each of the bus transceivers 16, 17, 18 is capable of transmitting and receiving the data.

In the reception permitted state, each of the bus transceivers 16, 17, 18 is incapable of transmitting the data bot capable of receiving the data. The power consumption of the reception permitted state is less than the power consumption of the transmission and reception permitted state.

In the transmission and reception inhibited state, each of the bus transceivers 16, 17, 18 is incapable of transmitting and receiving the data. The power consumption of the transmission and reception inhibited state is much less than the power consumption of the reception permitted state.

As shown in FIG. 2, when the bus transceiver 16, 17, 18 is in the transmission and reception permitted state and a condition, which will be described in a gateway processing, is satisfied, the controller 11 causes the bus transceiver 16, 17, 18 to transition to the reception permitted state. The controller 11 does not cause each of the bus transceivers 16, 17, 18 to transition from the transmission and reception permitted state to the transmission and reception inhibited state without bypassing the reception permitted state.

Suppose that one of the bus transceivers 16, 17, 18 is in the reception permitted state and a communication request is issued through corresponding one of the buses 5, 6, 7. In this case, the controller 11 causes the corresponding one of the transceivers 16, 17, 18 connected to the one of the buses 5, 6, 7 that issues the communication request to transition to the transmission and reception permitted state. "The communication request is issued" represents a case where a data transmission request is issued to the relay device 10, a case where a communication request frame is received from another node 30, and the like.

Suppose that the bus transceiver 16, 17, 18 is in the reception permitted state and a communication request is not issued during the predetermined sleep time t2. In this case, the controller 11 causes the transceiver 16, 17, 18 to transition to the transmission and reception inhibited state.

Suppose that one of the bus transceivers 16, 17, 18 is in the reception forbiddance state and a communication request is issued through corresponding one of the buses 5, 6, 7. In this case, the controller 11 causes the corresponding one of the transceiver 16, 17, 18 connected to one of the buses 5, 6, 7 that issues the communication request to transition to the transmission and reception permitted state. The controller 11 does not cause the bus transceiver 16, 17, 18 to transition from transmission and reception inhibited state to the transmission permission state without bypassing the transmission and reception permitted state.

As the relay function, the relay device 10 has a well-known function of relaying data among the multiple buses 5, 6, 7 to which the multiple nodes 30 are connected. The controller 11 receives the communication request frame which is transmitted from a node 30 connected to one of the buses 5, 6, 7, through the corresponding one of the bus transceivers 16, 17, 18 and is to be received by another node 30 connected to another one of buses 5, 6, 7. The controller 11 forwards the received communication request frame to one of the buses 5, 6, 7 corresponding to the destination.

Next, the node 30 will be described. Since each of the multiple nodes 30 has the same configuration and functions related to communication, the node 51 will be described as a representative of the multiple nodes 30.

As shown in FIG. 1, the node 51 includes a management unit 31 and a transceiver 32. The management unit 31 has similar hardware configuration to the controller 11 of the relay device 10. Further, the management unit 31 has similar data transmission and reception function and state transition function to the controller 11. As will be described in the node processing later, the time points at which the transition from the transmission and reception permitted state to the reception permitted state is set to be different between the management unit 31 and the controller 11.

The transceiver 32 performs transmission and reception of the data among the buses 5, 6, 7, similarly to the bus transceiver 16, 17, 18 of the relay device 10.

1-2. Processing

Next, the node processing executed by the management unit 31 of the node 51 will be described with reference to a flowchart of FIG. 3. The node processing may be started when the transceiver 32 of the node 51 transitions to the transmission and reception permitted state. The management unit 31 has a timer function for measuring time. In the node processing, the management unit 31 measures a time from the last transmission of the communication request frame to the bus, and a duration time indicative of a time during which the reception permitted state is maintained from the transition to the reception permitted state.

Figure 3:
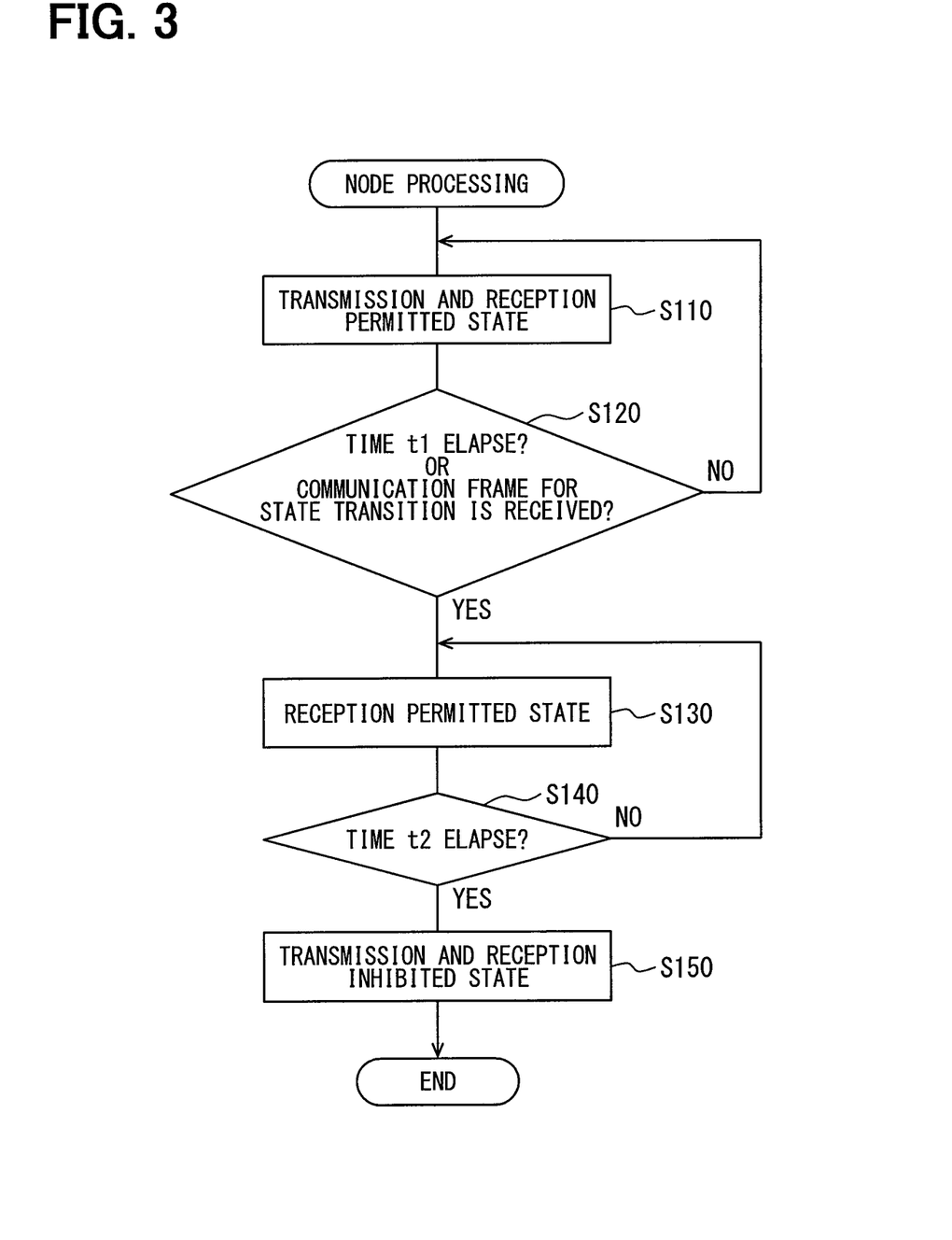
FIG. 3 is a flowchart showing a node processing.

In the node processing, as shown in FIG. 3, the management unit 31 maintains the transmission and reception permitted state in S110. In S120, the management unit 31 determines whether the transceiver 32 satisfies a condition for the transition to the reception permitted state. The condition under which the transceiver 32 transitions to the reception permitted state includes the elapse of a node transition time t1 or the reception of a transition command frame. The node transition time t1 is counted from the transmission of the communication request frame, by the node 51 or another node, to the bus 5, 6, 7 connecting the transceiver 32. The transition command frame represents the transition to the reception permitted state of the transceiver 32. That is, the conditions under which the node 51 transitions to the reception permitted state include a case where the transition is determined by the node 51 and the transition is instructed by another node.

When the condition for transitioning to the reception permitted state is not satisfied, the processing by the management unit 31 returns to the operation in S110. When the condition for transitioning to the reception permitted state is satisfied, in S130, the management unit 31 causes the transceiver 32 to transition to the reception permitted state.

Next, in S140, the management unit 31 compares the duration of the reception permitted state with the predetermined sleep time t2. When the duration of the reception permitted state is shorter than the sleep time t2, the management unit 31 returns to the operation in S130.

When the duration of the reception permitted state is equal to or longer than the sleep time t2, the management unit 31 causes the transceiver 32 to transitions from the reception permitted state to the transmission and reception inhibited state in S150. With the above-described operations completed, the node processing is terminated.

Figure 4:
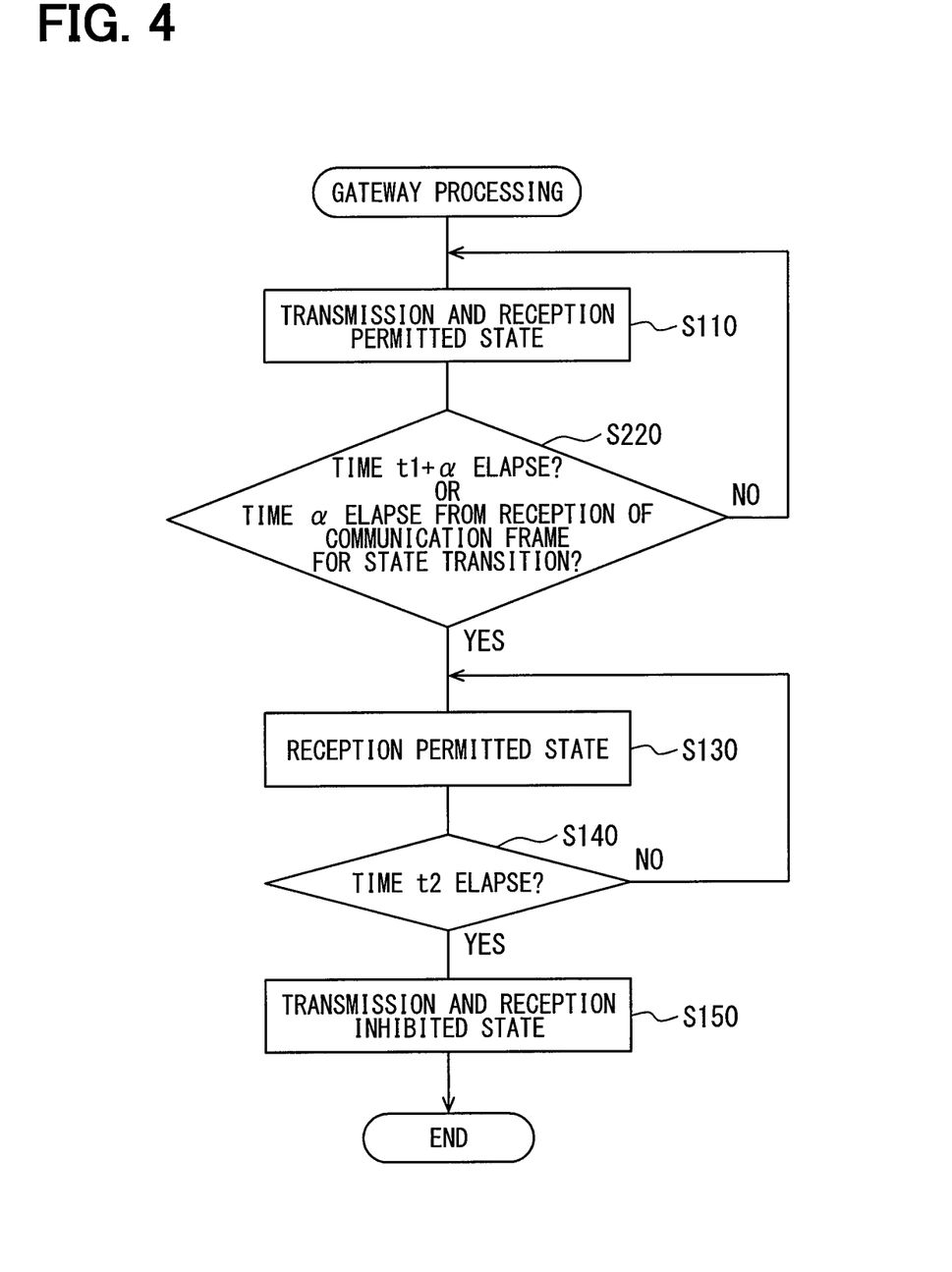
FIG. 4 is a flowchart showing a gateway processing.

The controller 11 of the relay device 10 executes the gateway processing shown in FIG. 4. The controller 11 of the relay device 10 executes the gateway processing to the bus transceiver 16, 17, 18 when the bus transceiver 16, 17, 18 transitions to the transmission and reception permitted state. The controller 11 has a timer function for measuring time. In the gateway processing, the controller 11 measures a time from the last transmission of the communication request frame to the bus by each of the bus transceivers 16, 17, 18, and the duration time similarly to the node processing.

In the gateway processing, almost similar processing to the node processing is executed, but the operation of S220 is executed instead of the operation of S120 of the node processing. In S220, the controller 11 determines whether the bus transceiver 16, 17, 18 satisfies a condition for the transition to the reception permitted state.

The condition under which the bus transceiver 16, 17, 18 transitions to the reception permitted state is different from the condition under which the transceiver 32 transitions to the reception permitted state. Specifically, the condition under which the bus transceiver 16, 17, 18 transitions to the reception permitted state includes the elapse of a relay transition time $t1+\alpha$ or another node connected to the bus 5, 6, 7. The relay transition time $t1+\alpha$ is counted from the transmission of the communication request frame by the bus transceiver 16, 17, 18. In the relay transition time $t1+\alpha$, a predetermined additional time $\alpha$ is added to the above described node transition time t1.

That is, when the communication request frame is not transmitted, the controller 11 maintains the transmission and reception permitted state for the additional time $\alpha$ longer than the node transition time t1, and thereafter, transitions to the reception permitted state. The additional time $\alpha$ can be set to an arbitrary value. In the present embodiment, the additional time $\alpha$ is set to a value greater than 0 and equal to or less than the sleep time t2.

The additional time $\alpha$ may be set corresponding to a transmission cycle indicative of a cycle at which the node 30 transmits the data based on the transmission request. A lower limit or an upper limit of the additional time $\alpha$ may be set based on the natural multiple of the transmission cycle. Suppose that the lower limit value of the additional time $\alpha$ is set to be a natural multiple of the transmission cycle. In this case, the relay device 10 can reliably receive the data transmitted by the node 30 based on the transmission request during the additional time $\alpha$.

With this configuration, when the relay transition time $t1+\alpha$ has elapsed, the controller 11 causes the bus transceiver 16, 17, 18 to transition from the transmission enabled state to the reception permitted state. When the sleep time t2 has elapsed after the elapse of the node transition time t1, the controller 11 causes the bus transceiver 16, 17, 18 to transition to the transmission and reception inhibited state.

The condition under which the bus transceiver 16, 17, 18 transitions to the reception permitted state also includes the reception of the transition command frame and the elapse of the addition time $\alpha$ from the reception. The transition command frame indicates that the transceiver 32 is to transition to the reception permitted state. That is, even when receiving the transition command frame, the relay device 10 does not immediately transition to the reception permitted state but transition to the reception permitted state after the elapse of the additional time $\alpha$.

That is, the condition under which the bus transceiver 16, 17, 18 transitions to the reception permitted state is set to the elapse of time for which the additional time $\alpha$ is added to the condition of transition to the reception permitted state for the node.

With the operation of S220 completed, the operation of S130 and the above are executed. When the operation of S150 is completed, the gateway processing is terminated.

Figure 5:
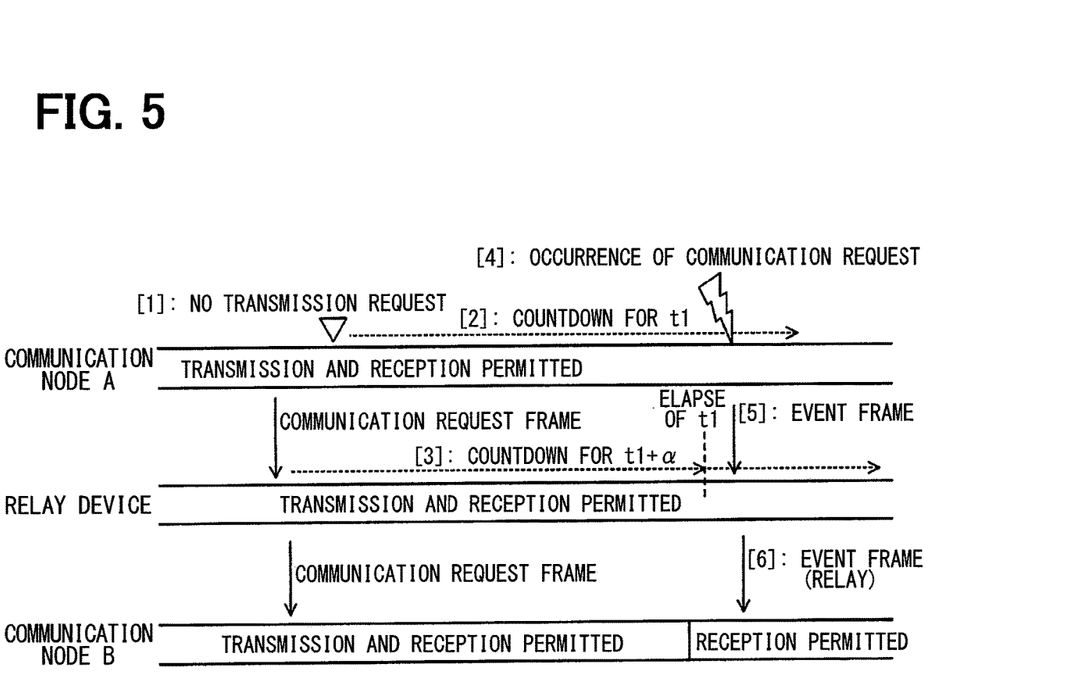
FIG. 5 is a diagram showing a timing chart for an operation of a relay device.

An example operation of the data transmission between a communication node A and a communication node B through the relay device 10 will be described with reference to FIG. 5. The communication node A is one of the multiple nodes 30. The communication node B is another one of the multiple nodes 30 which is connected to anther one of the buses 5, 6, 7 from the communication node A. Suppose that the communication node A transmits a communication request frame, which requests transmitting some kind of data to the communication node B. In this case, the communication node A firstly transmits the communication request frame to the relay device 10.

The relay device 10 transmits the communication request frame to the bus 5, 6, 7 which is connected to the communication node B. In the state where there is no data transmission request in the relay device 10, when receiving the communication request frame, the relay device 10 resets the relay transition time t1+α and clocking of the relay transition time t1+α is started.

Suppose that the transmission request keeps being issued for a while after the communication node A starts transmitting the communication request frame. In this case, the communication node A starts clocking the node transition time t1 after the issue of the communication request is finished. That is, there may be a case where the time point at which the relay device 10 starts clocking the relay transition time t1+α differs from the time point at which the communication node A starts clocking the node transition time t1.

In this case, there is a possibility that the relay device 10 receives an event frame or the like from the communication node A after the node transition time t1 has elapsed. In the present embodiment, the bus transceiver 16, 17, 18 of the relay device 10 continues the transmission and reception permitted state until the relay transition time t1+α elapses. With this configuration, the bus transceiver 16, 17, 18 can maintain the transmission and reception permitted state until the node transition time t1 elapses in the communication node A. With this configuration, even when receiving a frame to be relayed from the communication node A after the elapse of the node transition time t1, the relay device 10 can easily relay the frame.

1-3. Effects

According to the first embodiment detailed above, the following effects may be obtained.

(1a) In the above-described communication system 1, the relay device 10 includes the multiple bus transceivers 16, 17, 18 and the controller 11. The relay device 10 relays the data among the multiple buses. Each of the multiple buses connects one or multiple nodes 30.

A specific node representing at least one node among the one or multiple nodes 30 transitions among multiple states including a transmission enabled state and the transmission disabled state. In the transmission enabled state, the specific node can transmit the data. In the transmission disabled state, the specific node cannot transmit the data. The specific node transitions from the transmission enabled state to the transmission disabled state after the elapse of the predetermined node transition time t1 from the occurrence of the predetermined event.

The multiple bus transceivers 16, 17, 18 are provided to multiple buses in one to one manner. Each of the multiple bus transceivers 16, 17, 18 performs transmission and reception of the data and transitions among multiple states including the transmission enabled state and the transmission disabled state.

The controller 11 causes a specific bus transceiver to transition from the transmission enabled state to the transmission disabled state when the relay transition time t1+α has elapsed after the occurrence of the predetermined event. The relay transition time t1+α is obtained by adding the node transition time t1 to the predetermined additional time α. The specific bus transceiver represents one of the multiple bus transceivers 16, 17, 18 that performs transmission and reception of the data between the bus connected to the specific node.

The node transition time t1, for which the specific node transitions from the transmission enabled state to the transmission disabled state, is set to be longer than the relay transition time t1+α, for which the specific bus transceiver 16, 17, 18 transitions from the transmission enabled state to the transmission disabled state. Thus, while the specific node is in the transmission enabled state, the above-described relay device 10 can prevent the specific bus transceiver 16, 17, 18 from transitioning to the transmission disabled state. Thus, the configuration can simplify the structure of the communication system 1, and can prevent the relay device 10 from being incapable of relaying the data due to the transmission disabled state when the specific bus transceiver 16, 17, 18 transmits the data.

(1b) In the above-described communication system 1, all the nodes 30 among the multiple nodes are provided as the specific nodes. In the relay device 10, each of the multiple bus transceivers 16, 17, 18 is provided as the specific bus transceiver. The controller 11 causes each of the multiple specific bus transceivers to transition from the transmission enabled state to the transmission disabled state.

In the relay device 10, each of the multiple bus transceivers 16, 17, 18 is provided as the specific bus transceiver. The node transition time t1, for which the specific node transitions from the transmission enabled state to the transmission disabled state, is set to be longer than the relay transition time t1+α, for which the specific bus transceiver 16, 17, 18 transitions from the transmission enabled state to the transmission disabled state. Thus, the configuration can prevent each of the bus transceivers 16, 17, 18 to transition to the transmission disabled state when all the nodes 30 are in the transmission enabled state.

(1c) In the above-described communication system 1, the specific node transitions among the multiple states including the reception permitted state and the transmission and reception inhibited state, each of which is provided as the transmission disabled state. In the reception permitted state, the specific node cannot transmit the data but can receive the data. In the transmission and reception inhibited state, the specific node cannot transmit and receive the data. When the node transition time t1 has elapsed, the specific node transitions from the transmission enabled state to the reception permitted state. When the predetermined sleep time t2 has elapsed after the elapse of the node transition time t1, the specific node transitions from the reception permitted state to the transmission and reception inhibited state. In the relay device 10, the relay transition time t1+α is set to be equal to or shorter than the sum time of the node transition time t1 and the sleep time t2.

With this configuration, after the specific node transitions to the transmission and reception inhibited state, the relay device 10 can quickly transition from the transmission enabled state to the transmission disabled state. Thus, the configuration can achieve power saving and certainly relay the data.

(1d) In the above-described communication system 1, each of the multiple bus transceivers 16, 17, 18 of the relay device 10 transitions among the states including the reception permitted state and the transmission and reception inhibited state, each of which is provided as the transmission disabled state.

The above-described relay device 10 can transition to the transmission and reception inhibited state as the transmission disabled state, so that the configuration can save more power.

(1e) In the above-described communication system 1, when the relay transition time t1+α has elapsed, the controller 11 of the relay device 10 causes the specific bus transceiver 16, 17, 18 to transition from the transmission enabled state to the reception permitted state. When the sleep time t2 has elapsed after the elapse of the node transition time t1, the controller 11 causes the bus transceiver 16, 17, 18 to transition from the reception permitted state to the transmission and reception inhibited state.

The above-described relay device 10 can cause the specific bus transceiver to transition to the transmission and reception inhibited state in conjunction with the transition of the specific node to the transmission and reception inhibited state.

2. Other Embodiments

Although the embodiments of the present disclosure have been described above, the present disclosure is not limited to the embodiments described above, and various modifications can be made to implement the present disclosure.

(2a) In the above-described embodiment, each of the multiple nodes 30 functions as the specific node, but the present disclosure is not limited thereto. For example, at least one of the multiple nodes 30 may function as the specific node.

(2b) In the above-described embodiment, all the bus transceivers 16, 17, 18 are provided as specific bus transceivers, and the relay transition time t1+α, which is time for transitioning from the transmission from enabled state to the transmission disabled state, is set longer than the node transition time t1. The specific bus transceiver may be defined as the bus transceiver 16, 17, 18 that performs transmission and reception using the bus connected to the specific bus. In this case, only for the specific bus transceiver, the relay transition time t1+α, which is time for transitioning from the transmission enabled state to the transmission disabled state, may be set to be longer than the node transition time t1.

(2c) Further, in the above-described embodiment, the node transition time t1 can take an arbitrary value. For example, the node transition time t1 may be 0. In this case, the reception of the communication request frame, the issuance of the transmission request, or the reception of the transition command from the outside may be determined as the occurrence of the event, and may immediately trigger the transition from transmission enabled state to transmission disabled state. Such a configuration is also included in the technical idea in the claims of the present disclosure.

(2d) A plurality of functions of one element in the above embodiment may be implemented by a plurality of elements, or one function of one element may be implemented by a plurality of elements. Further, a plurality of functions of a plurality of elements may be implemented by one element, or one function implemented by a plurality of elements may be implemented by one element. A part of the configuration of the above embodiment may be omitted. At least a part of the configuration of the above embodiment may be added to or replaced with another configuration of the above embodiment. All modes included in the technical idea identified by the wording described in the claims correspond to embodiments of the present disclosure.

(2e) In addition to the communication system 1 described above, various features such as a device, for example a relay device or node, constituting the communication system 1, a program for making the computer function as the communication system 1, a non-transitory tangible storage medium such as a semiconductor memory in which the program is stored, and a transmission method may be provided to realize the present disclosure.

3. Correspondence Relation

Correspondence relation between the configuration of the present embodiments and the configuration of the present disclosure will be described below.

In the configuration of the embodiments described above, the bus A transceiver 16, the bus B transceiver 17, and the bus C transceiver 18 correspond to a communication portion referred to in the present disclosure. In addition, the operations of S110, S220, S130, S140, and S150 among the processing executed by the controller 11 in the above-described embodiment correspond to a state control portion referred to in the present disclosure.

The invention claimed is:

1. A relay device configured to relay data among a plurality of buses, each of which connecting one or more nodes, the relay device comprising:

a plurality of communication circuits configured to perform transmission and reception of the data and transition among a plurality of states including a transmission enabled state and a transmission disabled state, a transmission of the data enabled in the transmission enabled state, the transmission of the data disabled in the transmission disabled state, and the plurality of communication circuits connected to the plurality of buses in one to one manner; and a processor configured to cause a specific communication circuit of the plurality of communication circuits to transition from the transmission enabled state to the transmission disabled state when a relay transition time has elapsed from an occurrence of predetermined event, wherein;

a specific node, which represents at least one of the one or more nodes, transitions among the plurality of states including the transmission enabled state and the transmission disabled state;

the specific node transitions from the transmission enabled state to the transmission disabled state when a predetermined node transition time has elapsed from the occurrence of the predetermined event;

the specific communication circuit represents at least one of the plurality of communication circuits to which at least one of the plurality of buses connecting the specific node is connected; and the relay transition time is calculated to add a predetermined additional time to the predetermined node transition time.

2. The relay device according to claim 1, wherein:
each of the one or more nodes is provided as the specific node;
each of the plurality of communication circuits is provided as the specific communication circuit; and
the processor causes the specific communication circuit to transition from the transmission enabled state to the transmission disabled state.

3. The relay device according to claim 1, wherein:
the specific node transitions among the plurality of states including a reception permitted state and a transmission and reception inhibited state, each of which is provided as the transmission disabled state;
the transmission of the data is enabled in the reception permitted state, and the transmission and reception is disabled in the transmission and reception inhibited state;
the specific node transitions from the transmission enabled state to the reception permitted state when the node transition time has elapsed;
the specific node transitions from the reception permitted state to the transmission and reception inhibited state when a predetermined sleep time has elapsed from an elapse of the node transition time; and
the relay transition time is equal to or less than a sum of the node transition time and the sleep time.

4. The relay device according to claim 3, wherein
each of the plurality of communication circuits transitions among the plurality of the states including the reception permitted state and the transmission and reception inhibited state, each of which is provided as the transmission disabled state.

5. The relay device according to claim 4, wherein:
the processor causes the specific node to transition from the transmission enabled state to the reception permitted state when the relay transition time has elapsed; and
the processor causes the specific node to transition from the reception permitted state to the transmission and reception inhibited state when the sleep time has elapsed from the elapse of the node transition time.

6. A relay device configured to relay data among a plurality of buses, one or more nodes connected to each of the plurality of buses, at least one of the one or more nodes defined as a specific node, the specific node configured to transition among a plurality of states including a transmission enabled state and a transmission disabled state, a transmission of the data enabled in the transmission enabled state, the transmission of the data disabled in the transmission disabled state, and the specific node transitioning from the transmission enabled state to the transmission disabled state when a predetermined node transition time has elapsed from an occurrence of a predetermined event,
the relay device comprising:
a plurality of communication portions configured to perform transmission and reception of the data and transition among the plurality of states including the transmission enabled state and the transmission disabled state, and the plurality of communication portions connected to the plurality of buses in one to one manner; and
a state control portion configured to cause a specific communication portion of the plurality of communication portions to transition from the transmission enabled state to the transmission disabled state when a relay transition time has elapsed from the occurrence of the predetermined event, the specific communication portion representing at least one of the plurality of communication portions to which at least one of the plurality of buses connecting the specific node is connected, and the relay transition time calculated to add a predetermined additional time to the predetermined node transition time.

* * * * *